United States Patent [19]
Gazuit

[11] 3,726,169
[45] Apr. 10, 1973

[54] WIRE GAUZE CUTTING MACHINE

[76] Inventor: Georges Gazuit, Chemin Chauveau, 03 Montlucon, France

[22] Filed: June 21, 1971

[21] Appl. No.: 154,730

[30] Foreign Application Priority Data

Jan. 22, 1971 France..................................7102138

[52] U.S. Cl. .........................83/247, 83/268, 83/276, 83/482, 83/486, 83/508, 83/581
[51] Int. Cl. ..............................................B26d 7/16
[58] Field of Search.........................83/247, 268, 276, 83/486, 508, 482, 409, 412, 581; 221/212

[56] References Cited

UNITED STATES PATENTS

| | | | |
|---|---|---|---|
| 2,187,211 | 1/1940 | McKinley et al. | 83/482 |
| 2,766,043 | 10/1956 | Buccicone | 221/212 UX |
| 3,077,803 | 2/1963 | Hasselquist | 83/486 X |
| 3,120,915 | 2/1964 | Horn et al. | 83/488 X |
| 3,207,019 | 9/1965 | Vanzo et al. | 83/508 X |

*Primary Examiner*—Frank T. Yost
*Attorney*—Morton Amster et al.

[57] ABSTRACT

In this machine for cutting wire gauze web a magnetic-pull bar is movable along a feed beam for transferring the wire gauze web to be cut, for example obliquely with an angle of, say, 14° to 90°, towards the cutting beam, comprises a cutting carriage provided with a disk cutter mounted for free rotation thereon and adapted, during the cutting stroke, to be resiliently pressed along its periphery adjacent to the cutting edge against the downstream face of a cutting bar supporting with its upper face, upstream of the cutting line, the edge of the wire gauze web to be cut, which is resiliently clamped against said upper face of said cutting bar by a series of presser members, said disk cutter being adapted, during the return stroke of said cutting carriage and subsequent to a cutting operation, to be shifted automatically forwards and upwards so that its cutting edge is completely clear of the cutting bar.

8 Claims, 6 Drawing Figures

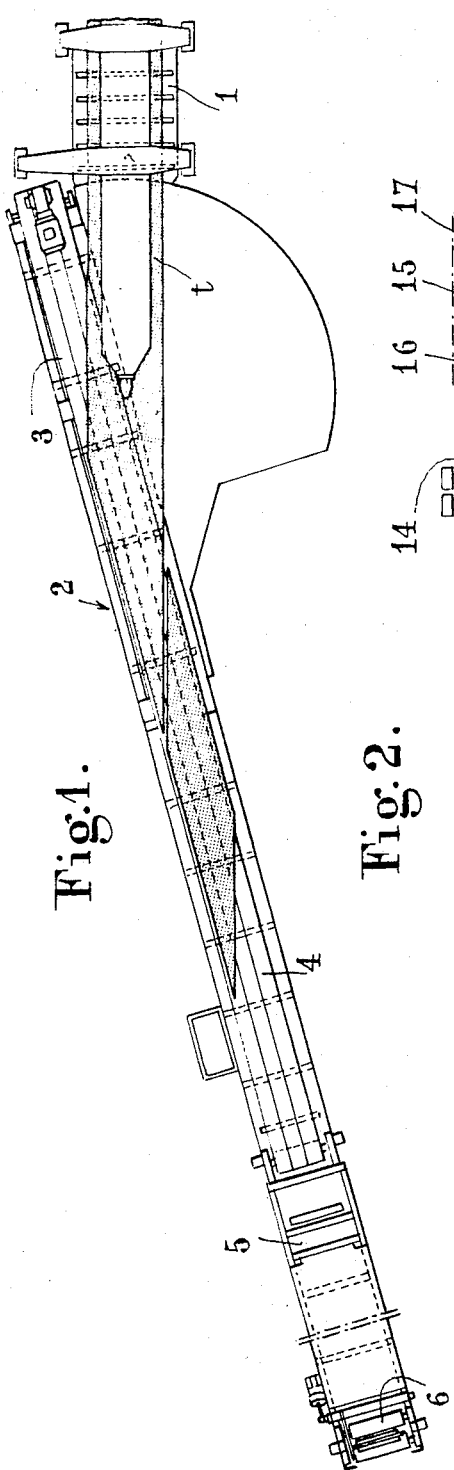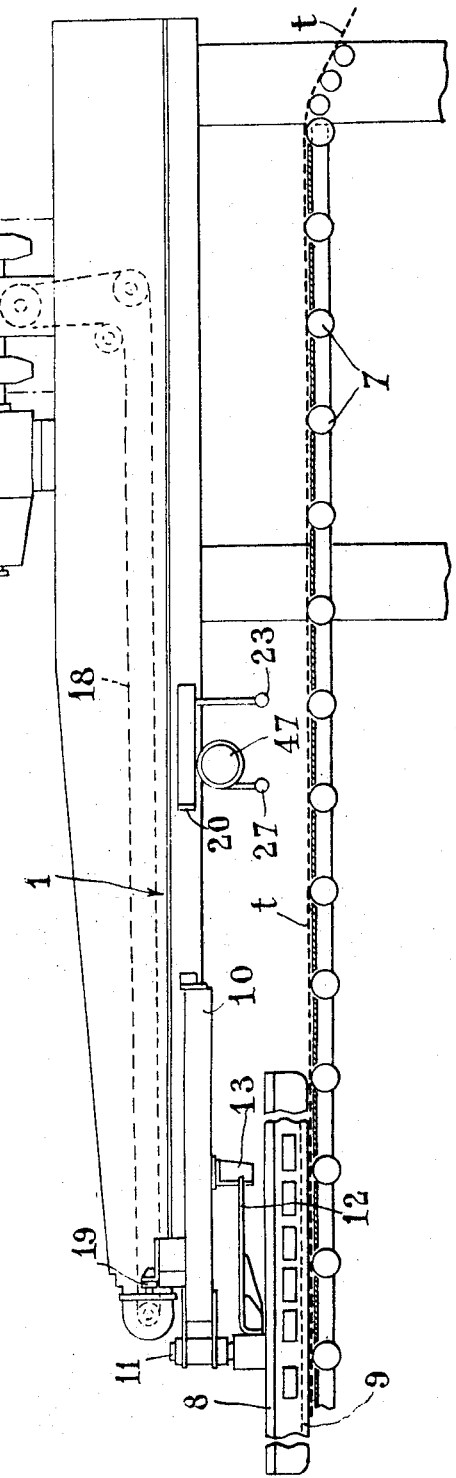

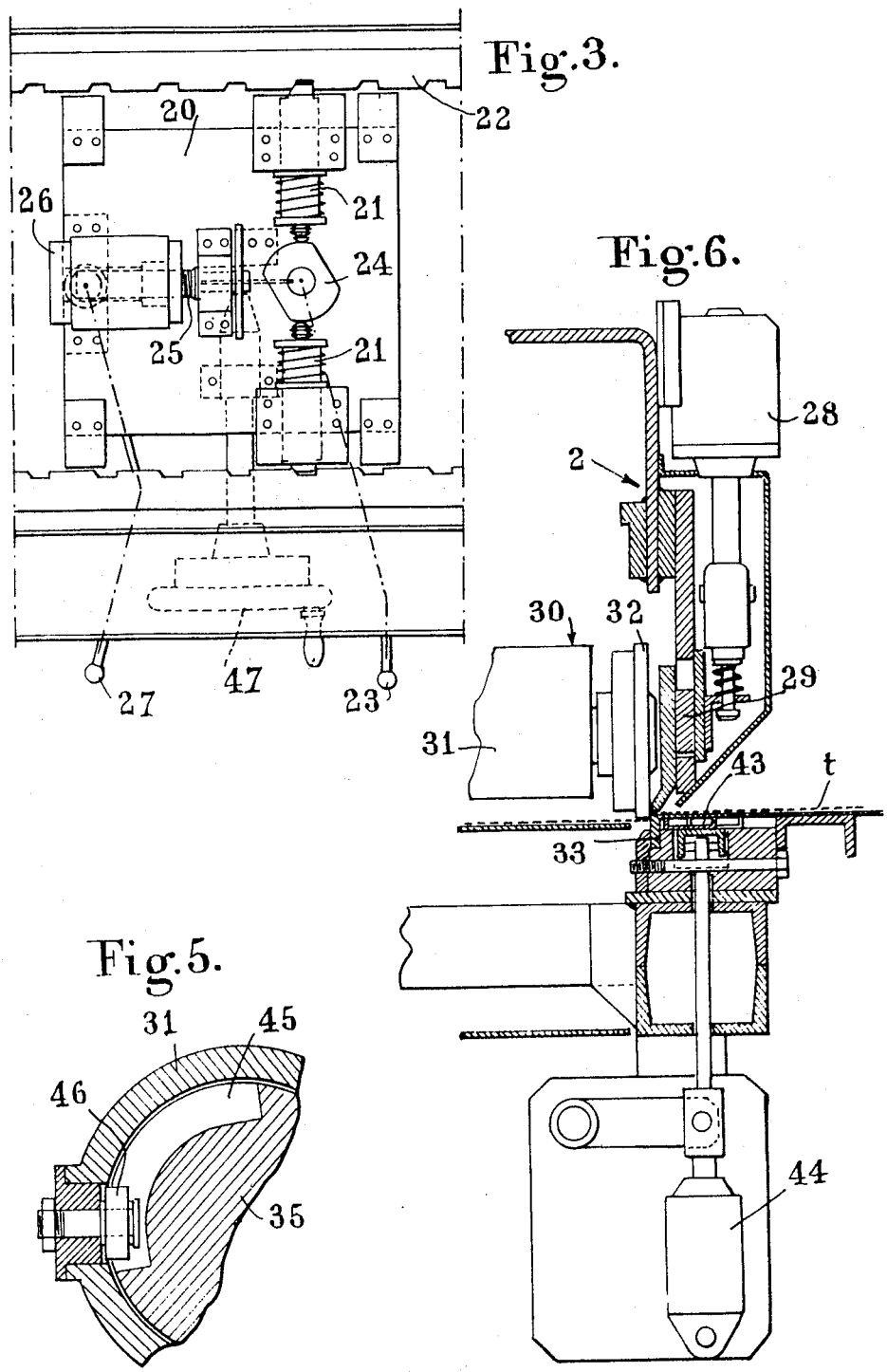

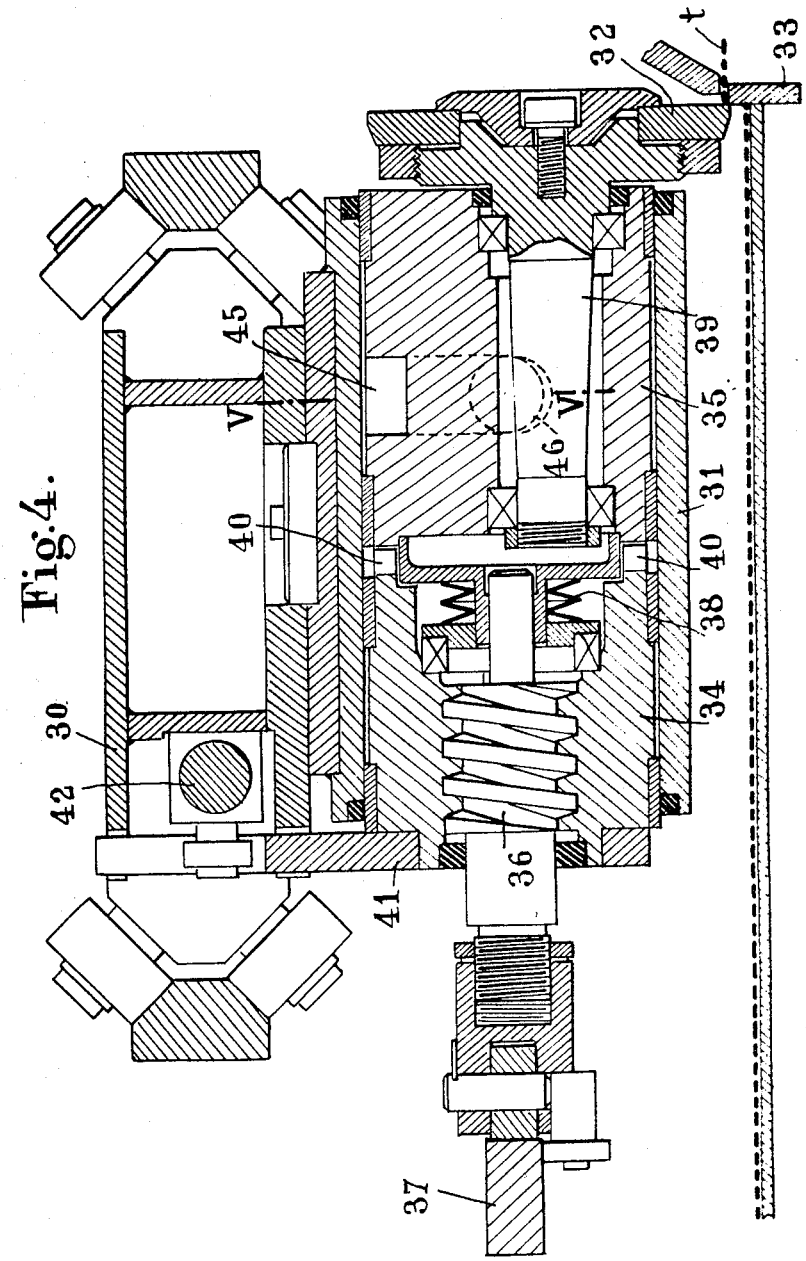

3,726,169

WIRE GAUZE CUTTING MACHINE

FIELD OF THE INVENTION

This invention relates in general to machines for cutting wire gauze and has particular reference to machines of this character but designed for the treatment of wire gauze strips manufactured by effecting the longitudinal juxtaposition of thin metal cables or wires embedded in rubber and subsequently fed through a calender acting transversely on said cables or wires.

Now these wire gauze strips are seldom utilized directly in their initial condition and more particularly they would be useless in the manufacture of tires. In fact, in this manufacture the wire gauze must necessarily have transverse or at least oblique wires in relation to the parallel edges of the strip.

DESCRIPTION OF THE PRIOR ART.

To manufacture these strips obtained from an initial web in which the wires extend in the longitudinal or axial direction, this web is cut along parallel, oblique lines in relation to the two edges of the web, to provide a series of lozenge-shaped pieces that are subsequently assembled along their edges, the aligned lines of cut being eventually bordered so as to form the edges of the transformed web.

To perform this work it is known to use a combination cutting machine comprising a feed beam for uncoiling a reel of wire gauze and a cutting beam pivotally mounted to one end of said feed beam so that the cutting angle may be varied from 14° to 90°, the web being cut at the input end of said cutting beam by means of a cutting device reciprocated along said cutting beam.

SUMMARY OF THE INVENTION.

It is the chief object of this invention to provide a wire gauze cutting machine of the general type broadly set forth hereinabove.

The cutting machine according to the present invention is characterized in that it comprises a magnetic-pull bar movable along the feed beam for transferring the wire gauze web to be cut towards the cutting beam, a cutting carriage provided with a disk cutter mounted for free rotation thereon and adapted, during the cutting stroke, to be resiliently pressed along its periphery adjacent to the cutting edge against the downstream face of a cutting bar supporting with its upper face, upstream of the cutting line, the edge of the wire gauze web to be cut, which is resiliently clamped against said upper face of said cutting bar by a series of presser members, said disk cutter being adapted, during the return stroke of said cutting carriage and subsequent to a cutting operation, to be shifted automatically forwards and upwards so that its cutting edge is completely clear of the cutting bar.

Thus, the wire gauze web to be transformed is fed along the feed beam in a particularly simple yet reliable manner, without any risk of damaging the web.

The structure of the cutting carriage is such that a particularly clean cut is obtained in a fully automatic manner by holding the edge to be cut on the cutting bar by means of the presser devices, and also by virtue of the rotational movement imparted to the disk cutter as a consequence of its frictional contact with said cutting bar.

BRIEF DESCRIPTION OF THE DRAWINGS.

The features and advantages characterizing this invention will appear more clearly and completely from the following description given with reference to the attached drawings illustrating diagrammatically a specific and exemplary form of embodiment of the invention. In the drawing:

FIG. 1 is a diagrammatic plan view from above of a combination cutting machine for transforming a wire gauze web of the longitudinal wire type into wire gauze strips having transverse or oblique wires;

FIG. 2 is a side elevational view of the feed beam;

FIG. 3 is a diagrammatic plan view of a device provided on the feed beam;

FIG. 4 is a longitudinal vertical section showing the cutting carriage, the section being taken along a plane transverse to the cutting beam;

FIG. 5 is a detail view of this carriage, taken along the line V—V of FIG. 4;

FIG. 6 is a fragmentary view showing on a smaller scale, in vertical section, the presser action.

DESCRIPTION OF THE PREFERRED EMBODIMENT.

The specific form of embodiment of the cutting machine illustrated in the drawings comprises essentially a feed beam 1 having pivoted to its front end, in a manner permitting of adjusting the cutting angle within the range of, say, 14° to 90°, a cutting beam 2 equipped with a discharge conveyor 3, 4 and also with a bordering station 5 and a winding station 6. The feed means (FIG. 2) includes a set of carrier rollers 7 supporting the wire gauze web $t$, a magnetic-pull bar 8 provided with a metal strip 9 adapted to fix the wire gauze web $t$ to the feed carriage 10.

The action exerted by the magnetic-pull studs of bar 8, when energized, is reinforced by the metal strip 9 so as to close continuously the magnetic circuit causing the wire gauze $t$ to adhere to said bar. The magnetic-pull bar 8 is suspended from the feed carriage 10 by means of a vertical pivot 11 rigidly supporting in concentric relationship a segment 12 adapted to be set and locked in the desired angular position, for example by means of a knurled-head screw, with respect to a bracket 13 rigid with the feed carriage 10. It is thus possible to adjust at will the inclination of the magnetic-pull bar 8 in relation to the feed carriage 10 and consequently in relation to the feed beam 1 so that, irrespective of the value of the angle of cut, at the end of the feed movement of carriage 10, said magnetic-pull bar will lie edge to edge with respect to the cutting beam 2.

The feed carriage 10 driven through a chain transmission 18 from a two-speed motor 14 provided with a reducting gear 15, a clutch 16 and a brake 17 is movable between a fixed abutment device 19 and a movable, adjustable abutment device 20 the position of which permits of presetting the width of the strip to be cut from the wire gauze web.

The movable abutment device 20 shown in detail in FIG. 3 is provided with positive locking means comprising studs 21 engageable in selected notches cut in the guide rails 22 of carriage 10. These studs are actuated by means of a control lever 23 through a double cam 24. To complete the precision adjustment of this device, a screw and nut assembly 25 is adapted to position as desired the stop member 26 proper. This device is adapted to be locked by means of a lock handle 27. A vernier 47 is associated with this device so that the adjustment can be made with all the necessary precision.

Although the construction illustrated comprises a motor and chain drive for the feed carriage 10, this carriage is adapted to operate between abutment or stop members in order to obtain exactly identical movements, independently of any variable external factors, such as frictional contact, adherence, or inertia.

The clutch 16 of FIG. 2 is provided to this end for operating as a coupling and permit at the end of the predetermined stroke or movement a certain slip during one fraction of a second when the carriage engages one of its two end stops.

The cutting assembly comprises a cutting beam 2 having secured thereto the fluid-actuated cylinder and piston units 28 (FIG. 6) and presser members 29 with their spring balance devices. The cutting carriage 30 (FIG. 4) is adapted to travel in this cutting beam, the necessary drive being provided by a two-speed motor associated with a reduction gear, a clutch and a brake as in the case of the feed carriage. Secured to this carriage 30 is a sleeve 31 adjustable angularly in a horizontal plane so that the disk cutter 32 can be inclined slightly in relation to the cutting bar 33. The inner space of sleeve 31 is filled by a pair of coaxial, rotatably mounted cylinders 34, 35. Cylinder 34 comprises a tapped bore engaged by a screw 36 held against motion by a reaction rod 37 and spring washers 38 for urging the disk cutter 32 against said cutting bar 33. The other cylinder 35 carries the disk cutter 32 and its eccentric shank 39, and has a helical groove or slot 45 formed in its outer periphery. A lost-motion coupling provided between the two cylinders comprises tenons 40, and the relative angular movements of these cylinders (through an angle of about 90°) is obtained by actuating a control lever 41 associated with a sliding bearing bar 42.

A peripheral groove 45 formed in cylinder 35 is engaged by a roller 46 pivotally mounted inside the sleeve 31, as shown in FIGS. 4 and 5.

The cutting assembly is completed by a set of unsticking members 43 (FIG. 6) responsive to control cylinders 44 and adapted to prevent the wire gauze, after the cutting step and before the feed movement, from adhering to the cutting bar 33.

A discharge conveyor consisting of three relatively small endless belts driven from a motor and reduction gearing unit is also provided. Its operation is part of a general cycle and the length of its movement, depending on the length of the cut wire gauze pieces or blanks, is detected by a pulse pick-up or sensing member, a notched disk being adapted to revolve in front of said member. The pulse number is recorded by a preselective counter.

Jointing, bordering and coiling stations 4, 5 and 6, respectively, as well as an uncoiling station disposed upstream of the machine, are necessary for the complete operation of the machine but are no part of this invention.

The cutting machine according to the present invention operates as follows:

The wire gauze web t uncoiled from the feed reel disposed upstream of the machine is attracted by the magnetic-pull bar 8 of feed carriage 10 when the latter is in its rear position in engagement with the movable, adjustable abutment device 20 (FIG. 2). Then the web is pushed to a position in which it lies under the cutting assembly, to the extent corresponding to the desired length to be cut, when the carriage 10 engages the front abutment member 19. The presser member 29 (FIG. 6) then causes the wire gauze to become rigid with the cutting bar 33, so that the magnetic-pull bar 8 can be released by discontinuing the energization of the electromagnets and restoring the carriage 10 under no-load conditions to its position of engagement with the starting stop 20 (FIG. 2), so as to prepare the next cutting operation. The cutting assembly illustrated in FIGS. 4 to 6, which comprises the cutting bar 33 and a disk cutter 32, permits of positioning the presser members 29 against the same cutting line, thus precluding any movement of the wire gauze during the cutting operation proper. This constitutes one of the essential features characterizing this invention and permits of preserving the proper quality of the cut wire-gauze material. The presser members 29 consist of a relatively great number of clamping elements connected to the control cylinders 28 via a spring-type compensation device. As a result, the clamping pressure exerted on the cut width is constantly the same, irrespective of the possible variations in the thickness of the wire gauze material.

The cutting movement is produced by the transverse displacement of carriage 30 along the cutting beam 2. The disk cutter 32 bears against the cutting bar 33 as a consequence of the pressure exerted by spring washers 38 prestressed between said bar 33 and the reaction rod 37 (without being power-driven) when the carriage 30 is moved, thus causing the cutting action.

At the end of the cutting stroke, and before the carriage 30 engages the corresponding stop, the sliding bearing bar 42 engages the stop and causes the lever 41 to pivot through about 90° and to cause in turn the rotation of cylinders 34 and 35. As a result, the action of screw 34 eliminates or releases the prestress of spring washers 38, as a consequence of the action exerted by roller 46 on the walls of the oblique groove 45, thus releasing the disk cutter 32 from the bar 33 and eventually, as a direct consequence of the rotation of the other disk 35, raising the cutting edge of the cutter 32 above the level of the cutting bar.

Then, a fresh piece of wire gauze may be fed under this disk while the carriage 30 resumes its initial position by performing the same sequence of operations as described hereinabove but in the reverse order.

It may be noted that, by properly determining the shape of groove 45, the action of spring washers 38 may be caused to occur only when the disk cutter 32 is in its lowermost position, so as to avoid any possibility of damaging this disk.

The cut piece of wire gauze is finally discharged by means of conveyor 3 of FIG. 1, and is subsequently assembled with the preceding piece at station 4, bordered at station 5 and coiled at station 6.

Of course, various modifications and variations may be brought to the specific form of embodiment described and illustrated herein by way of example, but

What I claim is:

1. Wire gauze cutting machine comprising a feed beam for uncoiling a roll of wire gauze web, a cutting beam pivotally mounted to the one end of said feed beam so that the cutting angle may be varied from 14° to 90°, and a cutting device adapted to be reciprocated along the cutting beam, which further comprises a magnetic pull bar movable beneath said feed beam for transferring the wire gauze web to be cut towards said cutting beam, and a cutting carriage provided with a disk-shaped cutter mounted for free rotation thereon and provided with a circular cutting edge, a cutting bar against which said disk cutter is adapted to be resiliently pressed during the cutting stroke so as to engage said bar with its peripheral portion adjacent said cutting edge, the upper face of said cutting bar supporting upstream of the cutting line the edge of the web of wire gauze to be cut, a series of presser members resiliently pressing the edge of the web of wire gauze to be cut against said upper face of said cutting bar, said disk cutter, during the return strokes of said cutting carriage, following each cutting operation proper, being shifted automatically downstream and upwards so as to have its cutting edge disengaged completely from said cutting bar.

2. Wire gauze cutting machine as set forth in claim 1, which comprises a pair of rails (22) mounted on said feed beam, a feed carriage mounted between said pair of rails and supporting said magnetic pull bar, said carriage being movable between two end positions, and a fixed downstream abutment device and an adjustable upstream abutment device for limiting said two end positions.

3. Wire gauze cutting machine as set forth in claim 2, wherein said downstream abutment device is adapted to be locked in notches cut in said rails, a stop member being mounted in an adjustable position on said downstream abutment device.

4. Wire gauze cutting machine as set forth in claim 2, which comprises a motor and a coupling device for releasably connecting said motor to said feed carriage while allowing said motor to slip when said carriage engages one of said abutment devices before said motor is stopped.

5. Wire gauze cutting machine as set forth in claim 1, which comprises a disk cutter bearing and a sleeve in which said bearing is rotatably mounted, said sleeve being carried by said cutting carriage, and a mechanism for controlling said bearing and cause in succession, at the end of a cutting stroke, the disengagement of said disk cutter in relation to said cutting bar, the movement of said disk cutter in the downstream direction and the upward movement of said disk cutter, above the level of the upper face of said cutting bar.

6. Wire gauze cutting machine as set forth in claim 5, wherein said disk cutter is eccentrically mounted in its bearing rotatably and slidably mounted in turn in said sleeve, this machine further comprising a roller carried by the inner surface of said sleeve and engaging a peripheral helical groove formed in the outer wall of said bearing.

7. Wire gauze cutting machine as set forth in claim 5, wherein said mechanism controlling the bearing of said disk cutter comprises a cylinder rotatably and slidably mounted in said sleeve, downstream of said bearing and comprising a screw rigid with said carriage and engaged in an axial tapped bore of said cylinder, an arm extending radially from said cylinder and automatic means for actuating said arm at the end of the strokes of said cutting carriage.

8. Wire gauze cutting machine as set forth in claim 7, wherein said bearing control mechanism comprises, between the upstream face of said cylinder and the downstream face of said bearing, means for exerting a resilient axial upstream thrust against said bearing, means for providing a lost-motion rotatable disengageable drive between said bearing and said cylinder.

* * * * *